United States Patent [19]

Reed et al.

[11] 4,026,228

[45] May 31, 1977

[54] METHOD AND APPARATUS FOR TEMPORARILY CONVERTING CAMPERS AND THE LIKE TO WATER-BASED UNITS

[75] Inventors: Richard E. Reed, Rockford, Ill.; Raymond E. Reed, Carefree, Ariz.

[73] Assignee: CAF Industries, Rockford, Ill.

[22] Filed: June 16, 1975

[21] Appl. No.: 587,244

[52] U.S. Cl. .................. 114/61; 114/268; 214/14
[51] Int. Cl.² ................................ B63B 1/14
[58] Field of Search ............ 9/1 T; 114/60–61, 114/70–73, .5 R, .5 BD; 61/64–67; 214/1 A, 12, 14, 15 D, 350, 354, 620; 280/46, 405 A, 405 R, 406 A, 414, 423 A, 423 R, 423 B, 424; 248/352, 351

[56] References Cited

UNITED STATES PATENTS

| | | | |
|---|---|---|---|
| 893,610 | 7/1908 | Devold | 61/67 |
| 2,415,805 | 2/1947 | Atwood et al. | 61/67 |
| 2,809,759 | 10/1957 | Manker | 280/423 R |
| 3,011,319 | 12/1961 | Ganzenmuller | 61/67 |
| 3,220,196 | 11/1965 | Schollard | 214/1 A |
| 3,238,733 | 3/1966 | Kreis | 61/67 |
| 3,335,437 | 8/1967 | Judkins | 9/1 T |
| 3,439,764 | 4/1969 | Kimball | 280/46 |
| 3,731,644 | 5/1973 | Bradt | 9/1 T |
| 3,740,957 | 6/1973 | McKenzie | 214/14 |
| 3,807,338 | 4/1974 | Shader | 114/60 |

*Primary Examiner*—Trygve M. Blix
*Assistant Examiner*—Jesus D. Sotela
*Attorney, Agent, or Firm*—Cahill, Sutton & Thomas

[57] ABSTRACT

Method and apparatus for converting recreational vehicles (RVs), camper bodies and trailers from land-based units to water-based units. Following conversion, the RV or camper becomes the "cabin" of a houseboat having an undercarriage which includes a pair of catamaran floatation pontoons supporting a flat deck. The undercarriage is fully supported during the loading of the RV or camper and is positioned level with the loading dock regardless of the water level in the launching body of water. The RV or camper is adjustably positioned on the undercarriage to produce a positive angle of attack in which the stern draws a deeper draft than the bow, and is then secured to the undercarriage to prevent relative movement between the RV or camper and the undercarriage.

27 Claims, 12 Drawing Figures

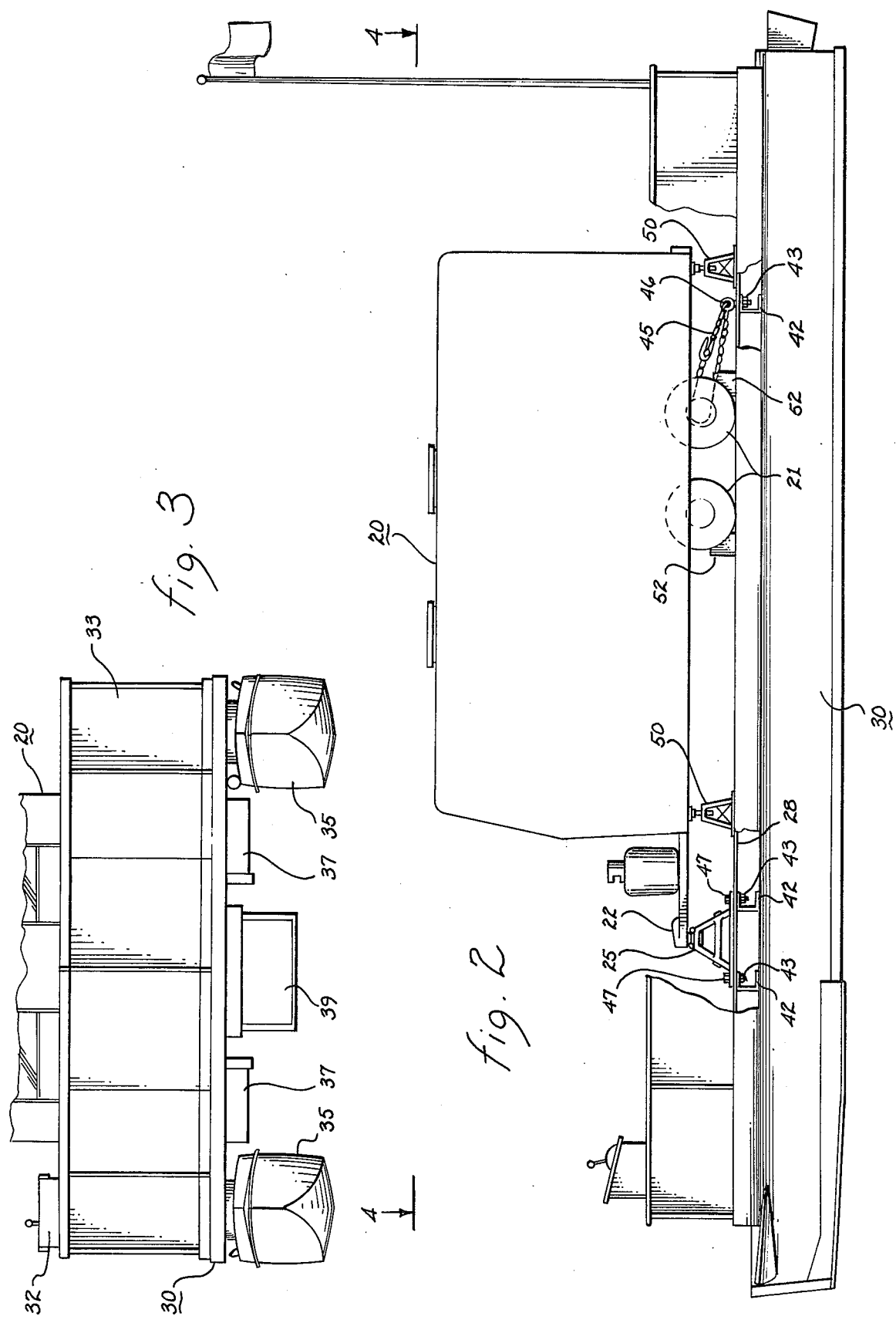

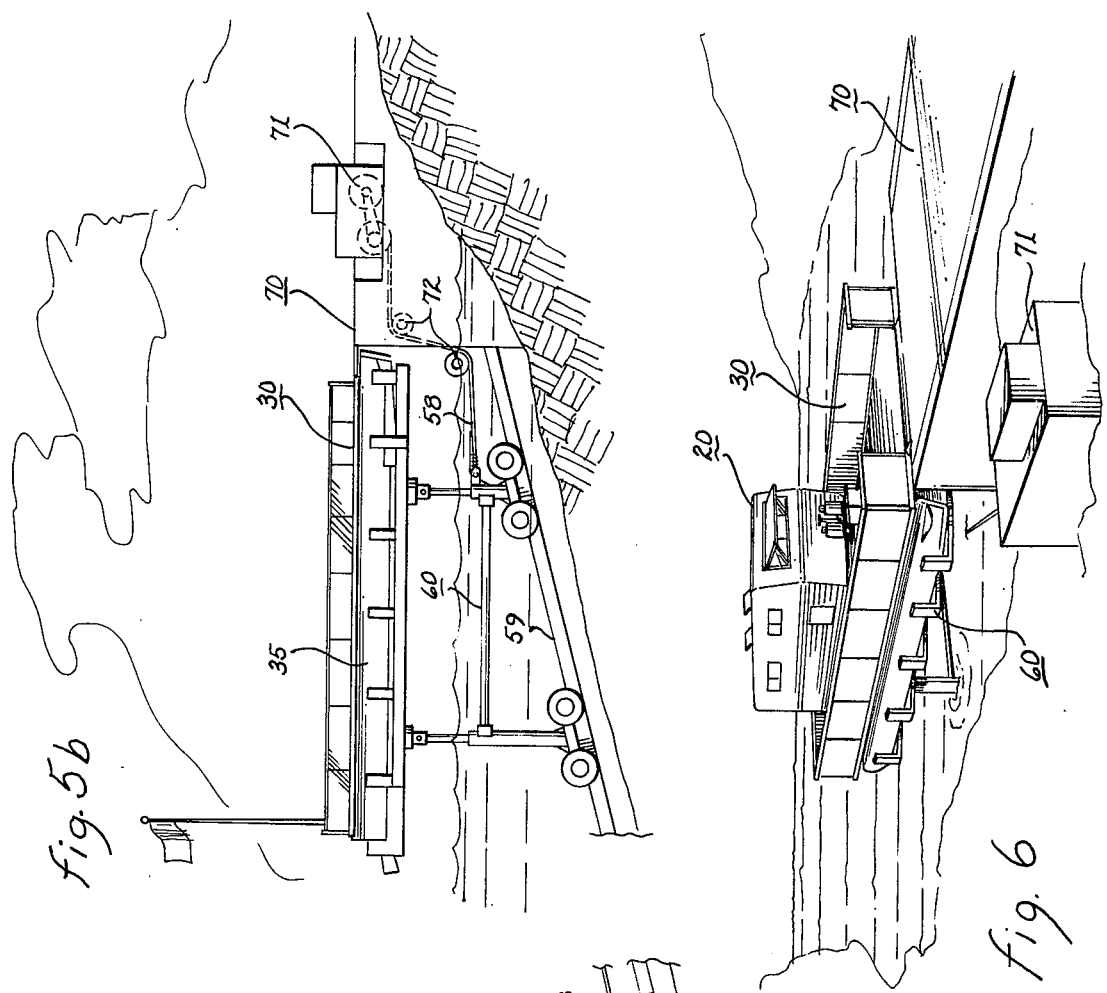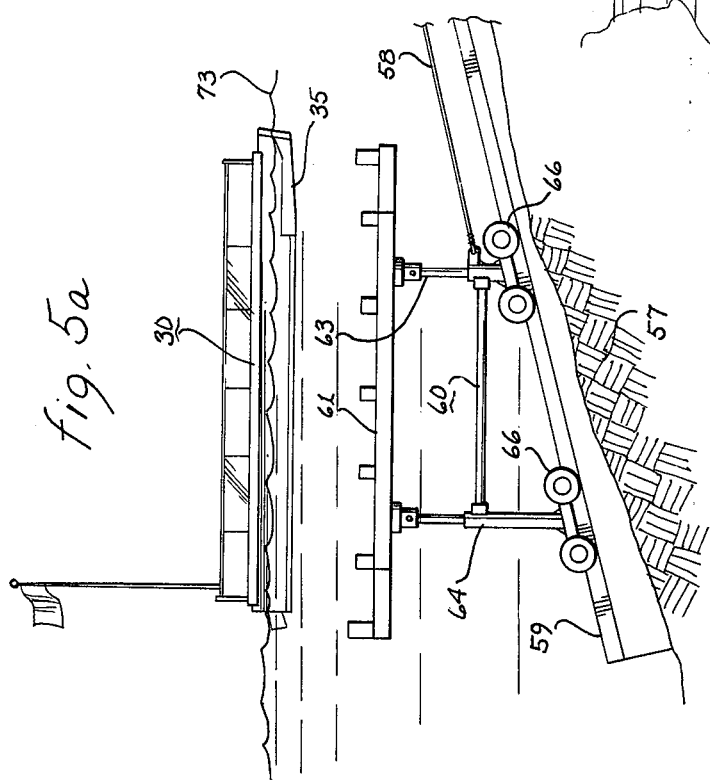

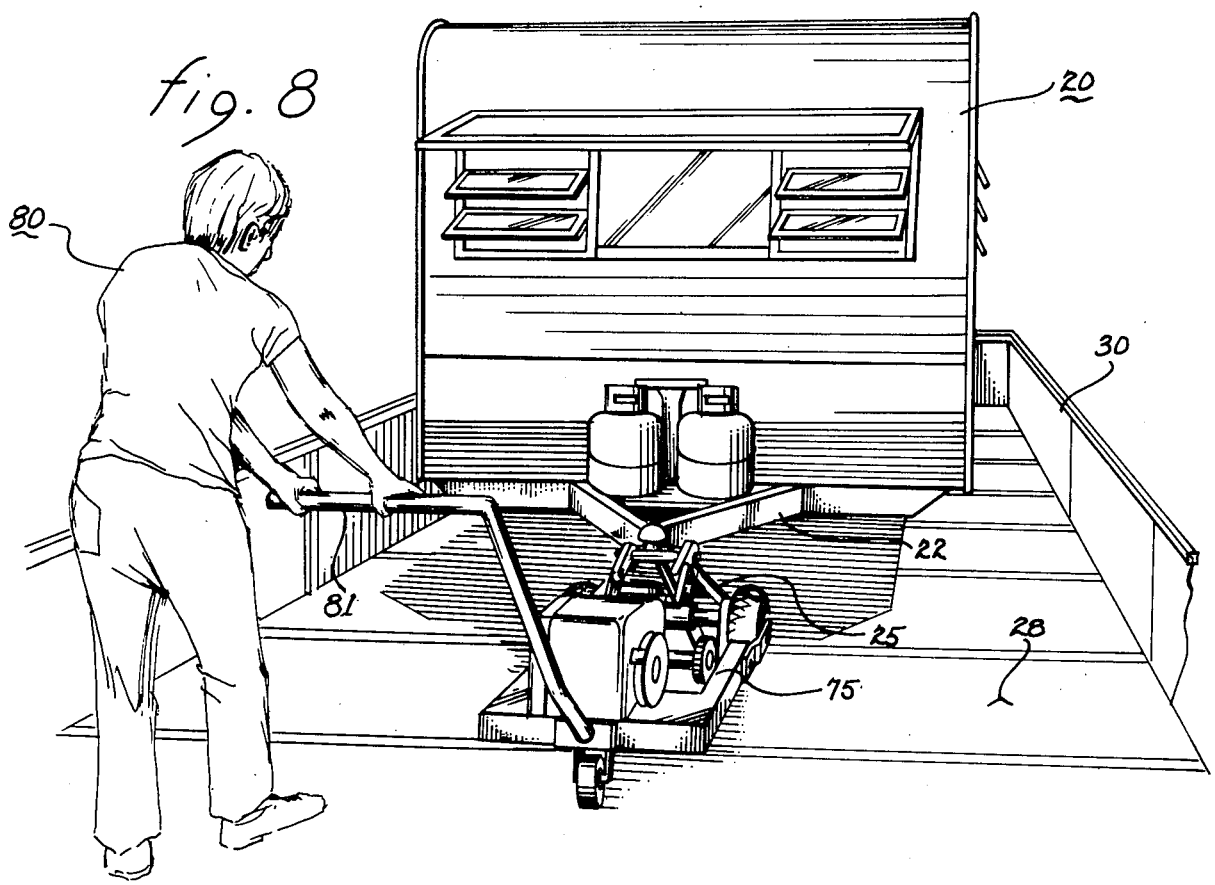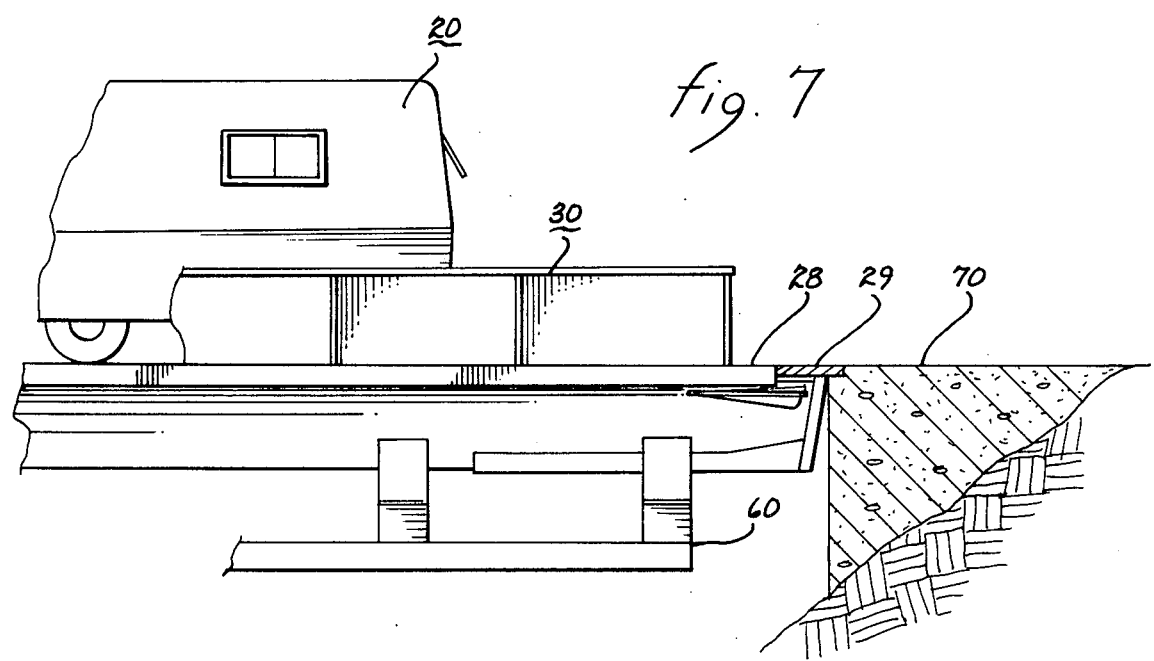

METHOD AND APPARATUS FOR TEMPORARILY CONVERTING CAMPERS AND THE LIKE TO WATER-BASED UNITS

BACKGROUND OF THE INVENTION

1. Field of the Invention

This invention relates to the conversion of a recreational vehicle (RV) or camper into a houseboat for use on water. More particularly, the invention relates to the apparatus and methods for loading the RV or camper onto a floatation undercarriage and fixedly securing the RV or camper to the undercarriage.

2. Description of the Prior Art

The conversion of a house trailer into a boat was disclosed by A. A. Haigh, et al. in U.S. Pat. No. 3,265,025, issued Jan. 9, 1966. A house trailer was converted from land-based use to water-based use by backing the trailer onto a boat over its rear, or stern end. To assist in the loading of the trailer onto the boat, a loading ramp could be extended from the rear deck of the boat. If the trailer was loaded from a dock, there was virtually no provision for compensating for any change in water level relative to the loading dock. Alternatively, if the trailer were loaded from the shoreline, the loading of the trailer from the stern of the boat would cause the stern to sink into the soft shoreline making the stern-positioned motors inoperable until the boat had been moved to deeper water.

Two significant shortcomings of the Haigh disclosure were the loading of the trailer from the stern of the boat, and a failure to make any provision to stabilize the boat during the loading of the trailer to prevent the stern from sinking substantially relative to its floating depth.

Subsequent improvements on the Haigh idea recognize the undesirability of loading from the stern and replaced that provision with a bow-loading arrangement. In U.S. Pat. No. 3,731,644, issued May 8, 1973, R. D. Bradt disclosed a catamaran vessel adapted to receive a pickup truck camper body or house trailer by loading over a detachable bow ramp. The vessel can be loaded directly from the shoreline without the use of a loading dock. In U.S. Pat. No. 3,335,437, issued May 15, 1967, A. B. Judkins discloses loading a pickup truck camper from a loading dock over the bow of a boat. U.S. Pat. No. 3,807,338 issued Apr. 30, 1974 to W. C. Shader discloses the conversion of a trailer into a utility boat by loading the trailer from the shoreline over the bow of the floatation portion.

All four of the above references are subject to a single shortcoming. Since the weight of a camper or trailer is concentrated at its axle, the placement of that axle at the bow of the boat on which it is being loaded will produce a substantial and concentrated load at the bow of the boat. Since no provision is made to stabilize the boat portion of these disclosures, the only result can be a substantial drop in the bow end of the boat, together with a significant tilt to the beam of the boat.

In his U.S. Pat. No. 3,745,954 issued July 17, 1973, J. M. A. J. Louet discloses a barge for ferrying a trailer where the barge is supported by a loading dock and loaded from the bow. Although the end of the barge is supported during the loading of the trailer, thereby preventing the end from dipping substantially below its floating position, this arrangement is effective only where the water level of the adjacent body of water never varies. Any body of water subject to tidal variations or subject to a demand usage for flood control, water supply purposes, or hydroelectric generating functions, will experience a significant range in water level. Since each of the above disclosures would be ineffective where the water level in the adjacent body of water varies, their applicability is significantly limited.

The location of the trailer on the supporting boat is quite critical. This results from the need for positioning the center of gravity of the trailer slightly behind the center of gravity of the floatation boat. Unless this orientation between the relative position of the center of gravities can be maintained, it is impossible to give the loaded boat the necessary attitude in the water. In order to obtain stability and control in the water, it is necessary that a boat have a slightly deeper draft at the stern than it does at the bow. Unless some adjustment in the positioning of the trailer on the boat is obtainable, this relative orientation cannot be guaranteed. Additionally, transverse adjustment is desirable to compensate for variations in transverse load distribution in various campers. Both the Bradt patent with its fixed rear pylon 22, and the Shader patent with a supporting ball that is adjustable primarily for height variation and with only moderate longitudinal and no transverse flexibility, could not provide the desired attitude when loaded.

Because it is desirable to load the trailer from the bow end of the boat, it is necessary to make the helm stand, containing the boat controls, either movable or risk interference between the helm stand and the trailer being loaded. The Shader patent makes provision for a hinged helm stand or conning column to lay approximately flat with the deck during the loading and unloading operations. However, since the angle between the deck and the loading ramp is variable, it cannot be guaranteed that an interference situation will not result.

SUMMARY OF THE INVENTION

An illustrative embodiment of the invention provides for loading a camper from a fixed dock onto a barge floating in a body of water adjacent to the dock. A track-mounted undercarriage engages the barge and raises it out of the wter into a stable and supported position adjacent to the dock. The hitch tongue of the camper is supported by a hitch tree which may be raised to permit the camper to be moved from the dock to the barge. The camper is positioned on the barge so that the center of gravity of the camper is located slightly astern of the center of gravity of the barge. The camper is then secured to, and supported by, the barge. The loaded barge is carried back to the water by the track and refloated.

It is an object of the invention to provide a method and apparatus for permitting a camper to be loaded across the bow of a barge.

It is another object of the invention to provide a method and apparatus for stabilizing a barge to prevent its movement during the loading of a camper.

It is yet another object of the invention to provide a method and apparatus for bringing a barge into a fixed relationship with a dock, without regard to the water level of the adjacent body of water, during loading of a land vehicle thereon.

It is still a further object of the invention to provide a method and apparatus for permitting a camper to be selectively located on a barge to place the center of gravity of the camper slightly astern of the center gravity of the barge, thereby establishing a stern heel configuration or positive angle of attack when the loaded barge is floated in the water.

A still further object of the invention is to provide a method and apparatus for permitting a camper to be readily located on a barge and when properly positioned, to be secured to the barge so that no relative movement between the barge and the camper can take place.

These and other objects and features of the invention will become apparent by reading the following detailed description of the illustrative embodiment in conjunction with the drawings.

BRIEF DESCRIPTON OF THE DRAWINGS

FIG. 2 is a side elevation view of the converted camper shown in FIG. 1.

FIG. 3 is a front elevation view of the converted camper shown in FIG. 1.

FIGS. 5a and 5b show in side elevation, the sequence of operation in which a floating, converted camper is raised into fixed position relative to the loading dock.

FIG. 6 is a perspective view of a converted camper supported in fixed relationship to the loading dock.

FIG. 7 is a partial side elevation showing the fixed relationship between the deck of the camper conversion and the loading dock.

FIG. 8 is a perspective view showing a camper being positioned on the barge portion of the camper conversion.

DETAILED DESCRIPTION OF THE ILLUSTRATIVE EMBODIMENT

Figure 1:
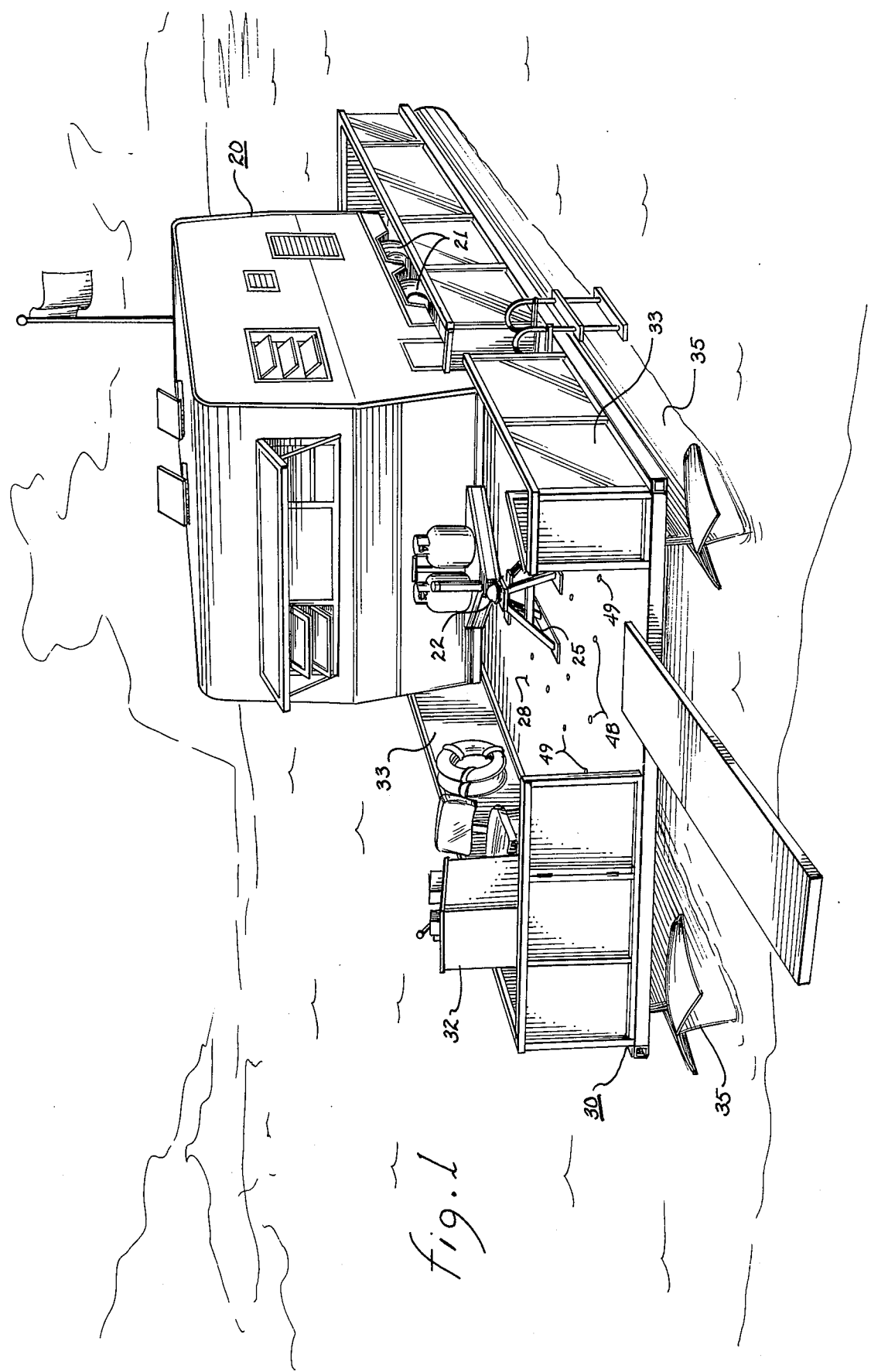
FIG. 1 is a perspective view of a converted camper in accordance with the invention.

A converted camper is shown in FIGS. 1 to 4 in which a camper body 20 has been loaded onto a floatation barge 30. Camper 20 is a single axle, trailer-type camper which is supported by its wheels 21 and towed by trailer tongue 22. It will be noted that camper 20 actually has two axles. The term "single axis" is used to indicate a camper having wheels at a single location and therefore requiring support, such as at the trailer tongue, to maintain a stable, level position as opposed to a camper having spaced apart front and rear axles. In addition, it should be pointed out that the term "camper" is used generically and is intended to include motor homes, recreational vehicles, camper-backed pickups, vans, single axle campers, and similar "live-in" vehicles.

Tongue 22 is supported by a hitch tree 25 which in turn is supported on deck 28 of barge 30. In addition to deck 28, barge 30 includes a pair of floatation pontoons 35, a helmstand 32 which contains the boating controls, and guardrails 33 which surround the perimeter of deck 28 for safety reasons. As can be seen in FIG. 2, the plates of deck 28 are supported by a deck support framework 42 comprising a plurality of transverse structural support members. For reasons which will be explained later, a series of locator holes 48 extend through deck 28 and the upper flange of framework 42. Welded to the underside of the framework 42 in conjunction with locator holes 48 are a number of mounting nuts 43.

In order to provide as much independence as possible, and permit lengthy excursions away from shore-based utility facilities, barge 30 is provided with utility tanks 37, as shown in FIG. 3. Utility tanks 37 include storage tanks for engine fuel, sewage storage tanks and drinking water tanks. The utility tanks have a capacity sufficient to provide several days' capacity before it would be necessary to connect to land-based utilities and refill or empty the utility tanks 37. Barge 30 also includes a power and steering unit 39 which provides the propulsion and control for the assembled unit. The control of power and steering unit 39 would be effectuated by the craft pilot operating helmstand 32.

The equipment for loading camper 20 onto barge 30 is shown in FIGS. 5a and 5b. The level of water line 73 will vary for many different reasons, such as tidal variations or water demand due to irrigation, drinking water supply demands, or the demand for hydroelectric power utilizing the water in a lake. Because loading dock 70 is rigidly fixed to the shoreline and does not vary along with water line 73, it is important that apparatus is provided for moving barge 30 into a fixed relationship with loading dock 70. In the embodiment chosen for illustration, the fixed relationship is provided through use of an undercarriage 60 which operates independent of the water level to bring barge 30 into a fixed and supported relationship with loading dock 70 regardless of the level of water line 73.

Undercarriage 60 is mounted on a track 59 which is positioned on lake bottom 57. Undercarriage 60 includes a support bed 61 which is effective to cradle the floatation pontoons 35 of barge 30. Undercarriage 60 also includes a pair of wheel carriages 66 which permit the undercarriage assembly to be moved along track 59. Wheel carriages 66 support bed 61 by a forward pedestal 63 and a rear pedestal 64. Forward pedestal 63 is substantially shorter than rear pedestal 64 so that bed 61 will be carried in a level position despite the noticeable incline to track 59. Undercarriage 60 can be moved along track 59 by a tow cable 58 which is operated by a take-up winch 71 located at loading dock 70. Once barge 30 has been properly positioned in fixed relationship to dock 70, as shown in FIGS. 5b and 7, deck 28 of the barge and loading plate 29 attached to the dock will be aligned and adjacent to each other. Camper body 20 can now be readily loaded from the loading dock onto the barge and the appropriate connections and attachments made to convert camper body 20 into the cabin of the boat formed in conjunction with barge 30. It may be noted that when the barge has been positioned as shown in FIGS. 5b and 7, all distances and measurements between the various elements of the system (including the dock and the barge) become fixed.

OPERATION

In order to convert a land-based camper body into a water-based pleasure craft, barge 30, which is shown in FIG. 5a floating at the water line 73, must be brought into proximity with a loading dock. As shown in FIG. 5b and in FIG. 6, a take-up winch 71 is located adjacent dock 70. Under control of an operator, winch 71 is operated to take up cable 58 which passes over cable pulleys 72. As cable 58 is taken up by winch 71, undercarriage 60 travels up the incline track 59 laid along lake bottom 57. As the wheel carriages 66 of undercarriage 60 move up track 59, support bed 61 moves into position beneath floatation pontoons 35 of barge 30. As undercarriage 60 continues from its position as shown in FIG. 5a to its position as shown in FIG. 5b, support bed 61 engages floatation pontoons 35 and lifts the entire barge 30 out of the water. Because barge 30 is lifted completely out of the water by undercarriage 60, it is unimportant what the level of water line 73 may be at the time the loading operation is undertaken. As shown in FIGS. 5b and 6, and as shown in detail in FIG. 7, barge 30 is now held in a supported and fixed relationship to loading dock 70. With barge 30 supported against movement by undercarriage 60, and with deck 28 in a fixed and proximate relationship to dock 70, camper body 20 can now be loaded onto the deck of the barge.

Figure 9:
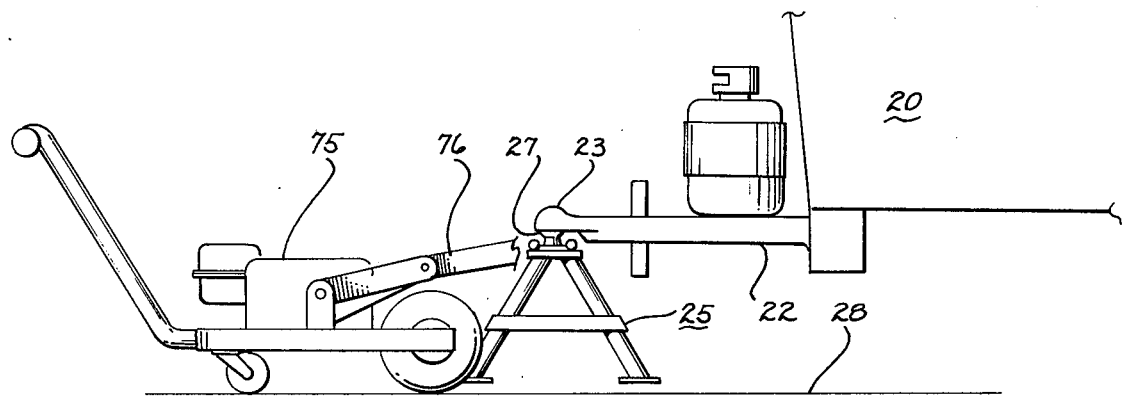
FIG. 9 is a side elevation view showing the equipment for positioning the camper on the barge portion of the conversion unit.
Figure 10:
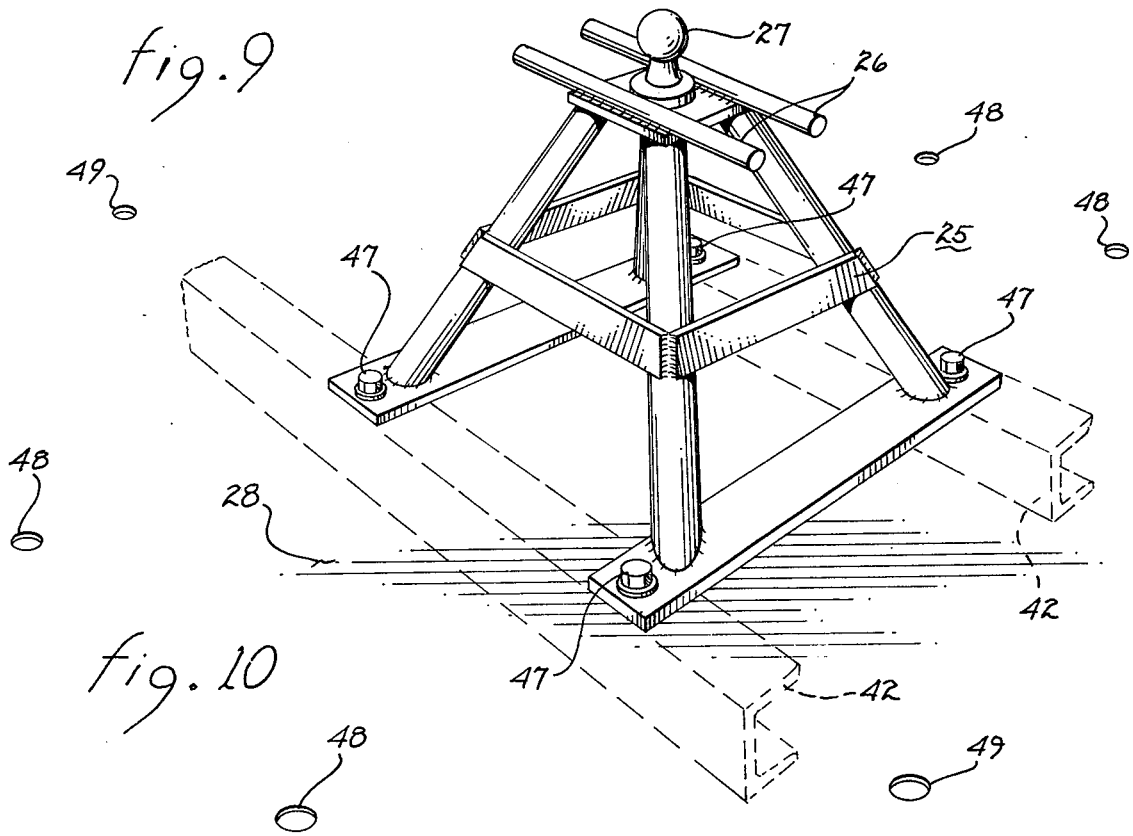
FIG. 10 is a perspective view of a hitch tree for supporting the trailer tongue of a camper.

In order to effectuate the loading and proper positioning of camper body 20 onto barge 30 a trailer tongue 22 of camper 20 is positioned onto a hitch tree 25 which supports the forward end of the camper in a position similar to that in which it would be towed on the highway. As can be seen clearly in FIG. 10, hitch tree 25 includes a pair of lift bars 26 located across the hitch tree and above the plate carrying the support ball 27 onto which a cup 23 of trailer tongue 22 will be positioned. As shown in FIGS. 8 and 9, camper 20 is moved from dock 70 onto deck 28 of barge 30 by utilizing a motorized mule 75. Mule 75 includes a pair of lifting arms 76 which contact lift bars 26 of hitch tree 25 and are effective to lift the hitch tree clear of dock 70. With lifting arms 76 of mule 75 supporting hitch tree 25 and thereby trailer tongue 22 of camper 20, the camper is free to move readily under the power of the motorized mule. An operator 80 now uses mule 75 to back camper 20 from loading dock 70 onto deck 28. Mule 75 has an extended control arm 81 permitting operator 80 control of the mule and the camper from a position along the side of deck 28. This permits operator 80 to sight along camper 20 and properly locate the wheels 21 relative to a visual transverse adjustment stripe 78. Stripe 78 is effectively made approximately three inches wide. This would permit "eyeball" positioning of a camper 20 having a tread distance between tires of 7 feet 3 inchs to 7 feet 9 inches (the most common sizes).

Figure 4:
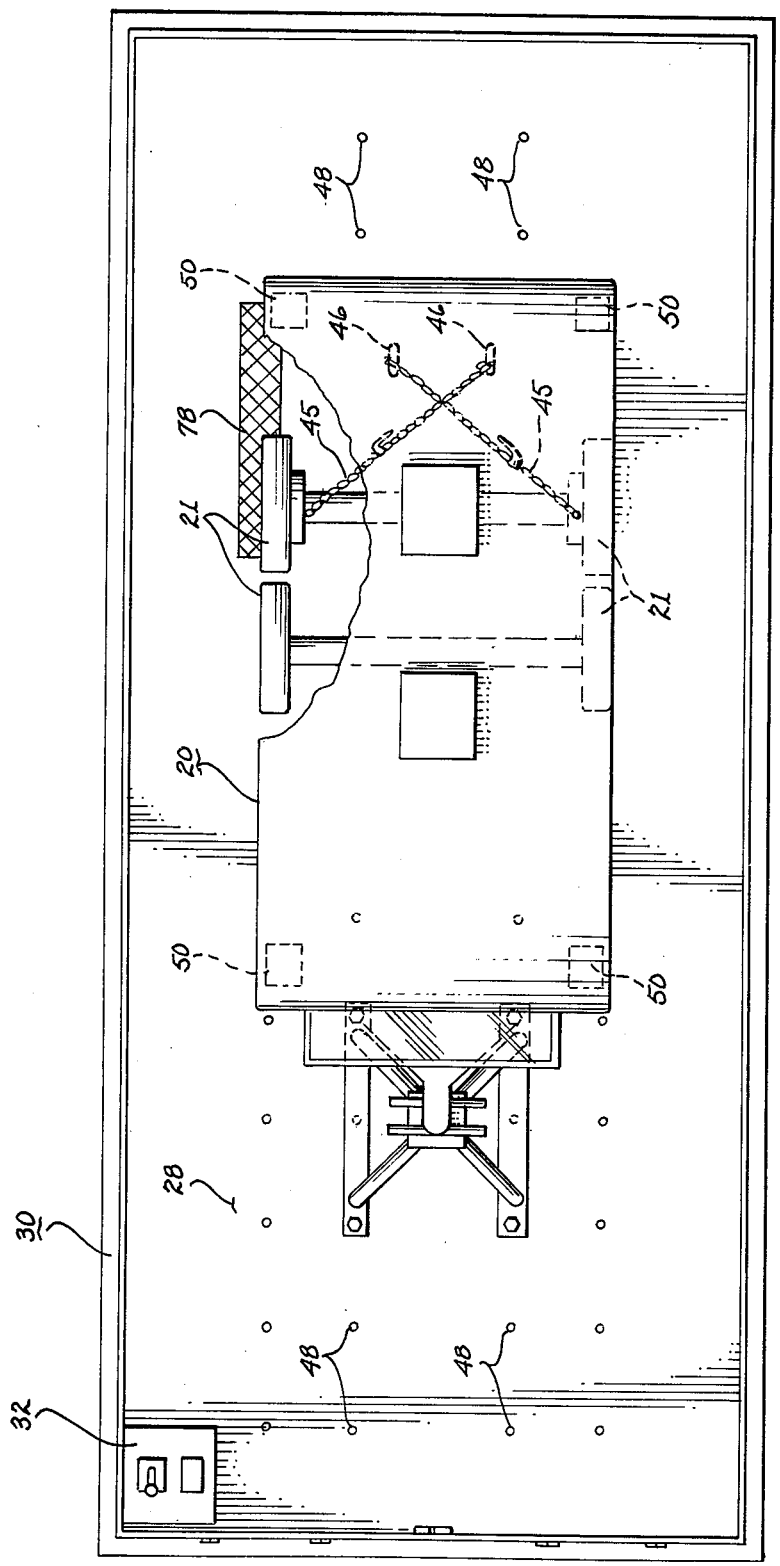
FIG. 4 is a plan view of the converted camper shown in FIG. 1.

The proper positioning of camper 20 on barge 30 is extremely important. In order to avoid a "mushing" condition in which the forward end of the converted boat would plow into the water, it is necessary to establish a condition called "stern heel" in which a positive angle of attack is created between the converted boat and the surface of the water. The positive angle of attack positions the stern end of the boat lower in the water than the bow end which raises the forward end of the boat out of the water when it is under power permitting increased control and an improved ride. In order to assure this positive angle of attack, it is necessary that the center of gravity of camper 20 be positioned toward the stern end of the center of gravity of barge 30. Because camper bodies come in a variety of lengths and because the center of gravity of campers of the same length will vary depending upon the equipment included within the camper, it is necessary that the positioning of camper body 20 on barge 30 be flexible. For this reason a plurality of locator holes 48 are provided along the length of deck 28, as shown in FIG. 4. The multiplicity of locator holes 48 permits the camper body 20 to be desirably located along the length of barge 30. The operator tentatively positions camper body 20 on barge 30, and hitch tree 25 is secured to deck 28. It is equally important to locate camper 20 with its transverse center of gravity coincident with the transverse center of gravity of barge 30. This avoids the undesirable condition where one side of barge 30 is more heavily loaded than the other side and accordingly rides lower in the water. Accordingly, additional adjustment locator holes 49 are provided parallel to locator holes 48. Holes 49 permit appropriate transverse adjustment of the location of camper 20 relative to barge 30.

Tow cable 58 is now payed out by take-up winch 71 to permit undercarriage 60 to move down track 59 causing barge 30 and the tentatively positioned camper body 20 to be refloated. A check is now made to ascertain the resulting angle of attack for the loaded barge. Whatever adjustments are required in the location of camper body 20 to produce the desired relationship between its center of gravity and the center of gravity of barge 30 are now made. When the adjustments are made so that the camper body 20 is located properly on barge 30, hitch tree 25 is let down by lifting arms 76 of mule 75 until the hitch tree contacts deck 28. Hitch tree 25 is now secured to barge 30 by securing bolts 47 through locator holes 48 to connect into mounting nuts 43 which were welded to deck support framework 42. Since cup 23 of trailer tongue 22 was previously connected to ball 27 of hitch tree 25, the forward end of camper body 20 is now rigidly secured to barge 30.

Figure 11:
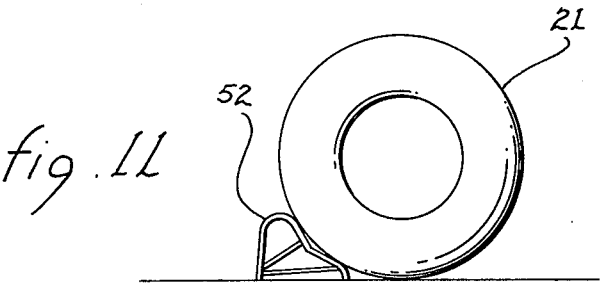
FIG. 11 is a side elevation view of the wheel of a camper showing the position of a wheel chock.

As shown in FIGS. 2 and 4, a pair of rings 46 are now connected to barge 30 by inserting them through locator holes 48 at the rear of deck 28 and securing the rings to mounting nuts 43 which connect to the deck support framework 42. The rear of camper body 20 is now attached to the deck by installing a pair of tie-down chains 45 from the rear of camper body 20 to the inserted rings 46. Wheels 21 of camper body 20 are also secured in position by placing wheel chocks 52 against each wheel as shown in FIG. 11. As shown in FIGS. 2 and 4, the four corners of camper body 20 are now further supported by placing a corner jack 50 between each corner of camper body 20 and the deck plates of deck 28. Camper body 20 is now rigidly supported relative to deck 28 of barge 30 and no relative movement between the camper body and the barge can occur.

It is particularly important to assure that no relative movement between camper body 20 and barge 30 takes place; not only because it is desirable to maintain the positive angle of attack, but also to ensure that camper body 20 remains in a level position despite the positive angle of attack. In order for many of the appliances in camper body 20 to properly function, it is necessary that camper body 20 be maintained within a few degrees of being level. This is particularly true of gas operated appliances, such as refrigerators and stoves. In order to compensate for the range of trailer lengths and tongue heights, hitch tree 25 can either be an adjustable height unit, or a variety of different hitch trees can be provided to accommodate the more usual heights required.

The center of gravity of most towed or trailer-style camper bodies is located at approximately two-thirds of the trailer length. To obtain the desired angle of attack, the center of gravity should be located approximately 2 feet behind the center of gravity of the barge. The most advantageous angle of attack, or planing attitude, is one that provides a 0.5 – 1.0% stern heel, that is, a condition in which the stern of barge 30 is 3 to 4 inches lower in the water than the bow end of a 35 – 40 foot long barge. This is not a critical range so long as a negative angle of attack is avoided. In order to compensate for the positive angle of attack and to maintain camper body 20 in the...

2. The method as set forth in claim 1, including the further steps of:
 a. locating the camper on the barge to obtain a desired weight distribution, and
 b. securing the camper to the barge.
3. The method as set forth in claim 2, further including the steps of:
 a. engaging the bottom of the barge with an under carriage...

c. connecting the trailer tongue to a supporting hitch tree;
d. lifting the hitch tree and the connected trailer tongue;
e. moving the camper from the dock to the proximate barge;
f. locating the hitch tree and the camper in a predetermined position on the barge;
g. lowering the hitch tree to contact the barge;
h. securing the camper in fixed relationship to the barge; and
i. lowering the loaded barge into the adjacent body of water to refloat the barge.

9. A method of converting a single axle camper having a trailer tongue and adapted for highway travel into a houseboat adapted for water travel, said method comprising the steps of:
 a. loading the camper onto a floatable base having a stern end;
 b. connecting the trailer tongue to a supporting hitch tree;
 c. lifting the hitch tree;
 d. locating the hitch tree to position the center of gravity of the camper slightly toward the stern end of the base relative to the center of gravity of the base;
 e. lowering the hitch tree to contact the base;
 f. securing the camper to the base to maintain the relative location between the center of gravity of the camper and the center of gravity of the base; and
 g. supporting the camper to prevent any relative movement between the camper and the base.

10. Apparatus for loading a camper from a fixed dock onto the deck of a barge floating in a body of water adjacent to said dock, said apparatus comprising in combination:
 a. an undercarriage for engaging the bottom of said barge and for supporting said barge with the barge's normal direction of travel perpendicular to said dock;
 b. elevator means attached to said undercarriage for raising said undercarriage and said engaged barge above the water level of the body of water to facilitate loading of said camper and for lowering said undercarriage and said engaged barge to refloat said barge following the loading of said camper; and
 c. means attached to said elevator means for controlling said elevator means to fix said raised undercarriage and said engaged barge in a predetermined and proximate relationship with said dock with the deck of said barge substantially co-planar with said dock, thereby facilitating the loading of said camper from said dock to said barge.

11. Apparatus in accordance with claim 10 wherein said elevator means includes:
 a. a rail, said rail originating beneath the surface of the body of water at a substantial distance from said dock, being supported to angle upward toward said dock and terminating adjacent to said dock; and
 b. means connected to said undercarriage and mounted on said rail and movable therealong, for supporting said undercarriage.

12. Apparatus in accordance with claim 10, further including:

a. means for moving said camper from said dock onto said barge;
b. means for locating said camper on said barge to obtain a desired weight distribution for said loaded barge; and
c. means contacting said camper and said barge for securing said camper to said barge in fixed relationship therewith.

13. Apparatus for loading a camper from a fixed dock onto the deck of a barge floating in a body of water adjacent to the dock, the apparatus comprising in combination:
 a. a rail, said rail originating beneath the surface of the body of water at a substantial distance from said dock, being supported to angle upward toward said dock and terminating adjacent to said dock;
 b. an undercarriage for engaging the bottom of said barge and supporting said barge with the barge's normal direction of travel perpendicular to said dock;
 c. wheeled means supporting said undercarriage and being movably positioned on said rail;
 d. means for controlling the movement of said wheeled means to raise said undercarriage and said engaged barge above the water level of the body of water and into a predetermined relationship with said dock and with the deck of said barge substantially coplanar with said dock thereby fixing said undercarriage in the predetermined relationship during the loading of said camper from said dock to said barge, and to lower said undercarriage and said engaged barge to refloat said barge following the loading of said camper;
 e. means for moving said camper from said dock onto said barge;
 f. means for locating said camper on said barge to obtain a desired weight distribution for said loaded barge; and
 g. means effective after said camper has been located on said barge for securing said camper to said barge in fixed relationship therewith.

14. Apparatus for loading a single axle camper having a trailer tongue at the front end thereof from a fixed dock onto a barge floating in a body of water adjacent to the dock, said apparatus comprising in combination:
 a. elevator means for raising said barge above the water level of the body of water and into proximity with said dock in fixed relationship therewith;
 b. a hitch tree connectable to the trailer tongue of said camper for supporting the front end of said camper;
 c. grip means for releasably engaging said hitch tree;
 d. lifting means connected to said grip means for selectively raising and lowering said hitch tree and the front end of said camper; and
 e. power means controlling said lifting means to raise said hitch tree and the front end of said camper and to move said raised hitch tree and camper from said dock onto said barge.

15. Apparatus in accordance with claim 14 wherein said elevator means comprises:
 a. a rail, said rail originating beneath the surface of the body of water at a substantial distance from said dock, being supported to angle upward toward said dock and terminating adjacent to said dock;
 b. an undercarriage for engaging and supporting said barge;

c. wheeled means supporting said undercarriage and movable along said rail; and d. means for controlling the movement of said wheeled means along said rail and thereby controlling the raising and lowering of said barge reltive to the water level of the body of water and the movement of said barge relative to said dock.

16. Apparatus in accordance with claim 14, including:

a. means for securing said hitch tree to said barge; and b. means for contacting said barge and said secured camper to hold said camper in fixed relationship with said barge.

17. Apparatus for loading a single axle camper having a trailer tongue at the front end thereof from a fixed dock onto a barge floating in a body of water adjacent to the dock, said apparatus comprising in combination:

a. a rail, said rail originating beneath the surface of the body of water at a substantial distance from said dock, being supported to angle upward toward said dock and terminating adjacent to said dock;

b. an undercarriage for engaging and supporting said barge;

c. wheeled means supporting said undercarriage and movable along said rail;

d. means for controlling the movement of said wheeled means to raise and engaged barge above the water level of the body of water and into proximity with said dock in fixed relationship therewith;

e. a hitch tree connectable to the trailer tongue of said camper for supporting the front end of said camper;

f. grip means for releasably engaging said hitch tree;

g. lifting means connected to said grip means for selectively raising and lowering said hitch tree and the front end of said camper;

h. power means controlling said lifting means to raise said hitch tree and the front end of said camper and to move said raised hitch tree and camper from said dock onto said barge;

i. means for securing said hitch tree to said barge; and j. means for contacting said barge and said secured camper to hold said camper in fixed relationship to said barge.

18. Apparatus for converting a single axle camper having a trailer tongue at the front end thereof and adapted for highway travel into a houseboat adapted for water travel, said apparatus comprising in combination:

a. a floatable base having a stern end;

b. a hitch tree connectable to the trailer tongue of said camper for supporting the front end of said camper;

c. lifting means for selectively raising and lowering the hitch tree and the front end of said camper;

d. means for loading said camper onto said base;

e. locator means for locating said camper to position the center of gravity of said camper slightly toward the stern end relative to the center of gravity of said base;

f. means controlling said lifting means to lower the hitch tree to contact the base after said camper is positioned by said locator means;

g. means for securing said hitch tree to said base to maintain the relative location between the center of gravity of the camper and the center of gravity of said base; and h. means for contacting said camper and said base to hold said camper in fixed relationship to said base.

19. Apparatus for converting a camper having wheels and being adapted for highway travel into a houseboat adapted for water travel, said apparatus comprising in combination:

a. a fixed position dock extending adjacent a body of water onto which said camper may be driven;

b. a floatable deck for carrying said camper;

c. elevator means for engaging said deck to lift said deck into a fixed and proximate relationship with said dock with the normal direction of travel of said floatable deck perpendicular to said dock, and with said deck substantially co-planar with said dock;

d. power means for loading said camper from said dock onto said deck;

e. securing means for securing said camper to said deck;

f. means contacting said camper and said deck for supporting said camper and preventing relative movement between said camper and said deck;

g. said elevator means comprising:

1. an undercarriage for engaging and supporting said floatable deck;

2. a rail, said rail originating beneath the surface of the body of water at a substantial distance from said dock, being supported to angle upward toward said dock and terminating adjacent to said dock;

3. wheeled means for supporting said undercarriage and being movable along said rail; and 4. means for controlling the movement of said wheeled means along said rail, thereby controlling the raising and lowering of said undercarriage and said floatable deck relative to the water level of the body of water and the movement of said deck relative to said dock.

20. Apparatus for converting a single axle camper having wheels adapted for highway travel at its rear end and a hitch tongue adapted for towing by another vehicle at its front end into a houseboat adapted for water travel, said apparatus comprising in combination:

a. a loading dock being fixed in position and extending adjacent a body of water, said dock adapted to permit said camper to be driven thereon;

b. a floatable deck for carrying said camper;

c. elevator means engaging said deck for lifting said deck into a fixed and proximate relationship with said dock with the normal direction of travel of said floatable deck perpendicular to said dock, and with said deck substantially co-planar with said dock;

d. stand means for supporting the hitch tongue of said camper to permit movement of said camper;

e. power means for controlling said stand means to move said camper from said dock onto said deck;

f. securing means for attaching said camper to said deck;

g. support means for preventing relative movement between said deck and said camper;

h. said elevator means including:

1. an undercarriage for engaging and supporting said floatable deck;

2. a rail, said rail originating beneath the surface of the body of water at a substantial distance from said dock, being supported to angle upward toward said dock and terminating adjacent to said dock;

3. wheeled means for supporting said undercarriage and being movable along said rail, and
4. means for controlling the movement of said wheeled means along said rail, thereby controlling the raising and lowering of said undercarriage and floatable deck relative to the water level of the body of water and the movement of said deck relative to said dock.

21. Apparatus in accordance with claim 20, wherein said floatation deck includes:
   a. a pair of floatation pontoons;
   b. a structural framework interconnecting said pontoons; and
   c. a deck supported by said structural frame.

22. Apparatus in accordance with claim 21, wherein said stand means comprises:
   a. a hitch tree,
   b. a ball attached to said hitch tree and connectable to the hitch tongue of said camper;
and wherein said power means includes:
   c. grip means to releasably engage said hitch tree; and
   d. means for raising said grip means to permit movement of said hitch tree and said camper connected thereto and for lowering said grip means to bring said hitch tree into contact with said deck.

23. Apparatus in accordance with claim 22, wherein said securing means includes:
   a. a plurality of anchors attachable through said deck to said supporting framework; and
   b. a plurality of flexible links attachable to said anchors for securing said camper to said anchors.

24. Apparatus in accordance with claim 23, wherein said support means includes a plurality of extendable jacks for contacting said deck and said camper to prevent relative movement between said deck and said camper.

25. Apparatus in accordance with claim 24, wherein said securing means further includes means extending through said deck for attaching said hitch tree to said supporting framework.

26. A system of the type for converting a wheeled camper, adapted for highway travel and having a trailer tongue at the front end thereof which is connectable to a supporting hitch tree, into a floatable craft adapted for water travel by loading the camper from a dock extending into a body of water onto a floatation barge, wherein the improvement comprises:
   a plurality of projections extending from said hitch tree and lifting means releasably engaging said projections for lifting said hitch tree to permit movement of said hitch tree and said camper and for lowering said hitch tree to contact said barge when said camper is properly positioned thereon.

27. A system of te type for converting a wheeled camper adapted for highway travel into a floatable craft adapted for water travel by loading the camper from a dock extending adjacent a body of water onto the deck of a floatation barge, wherein the improvement comprises:
   means for engaging said barge to raise it above the water level of the body of water and into a proximate and fixed relationship with said dock to facilitate loading with the normal direction of travel of said floatation barge perpendicular to said dock, and with the deck substantially co-planar with said dock.

* * * * *